Sept. 25, 1951  V. A. LARSEN  2,568,811
VEHICLE WINDOW WEATHER STRIP
Filed April 4, 1950  2 Sheets-Sheet 2
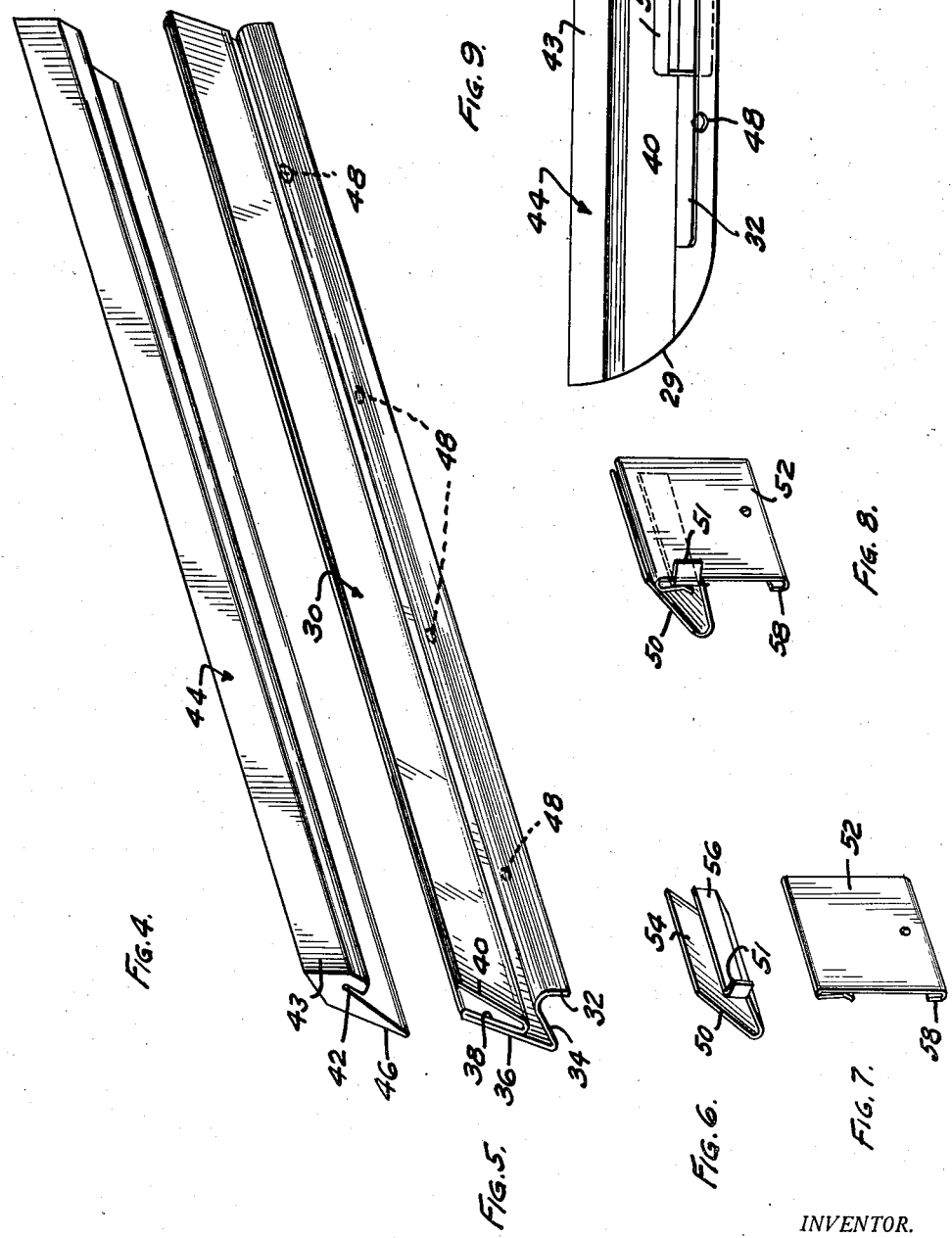
INVENTOR.
VICTOR A. LARSEN
BY
Harry H. Hitzeman
ATTORNEY.

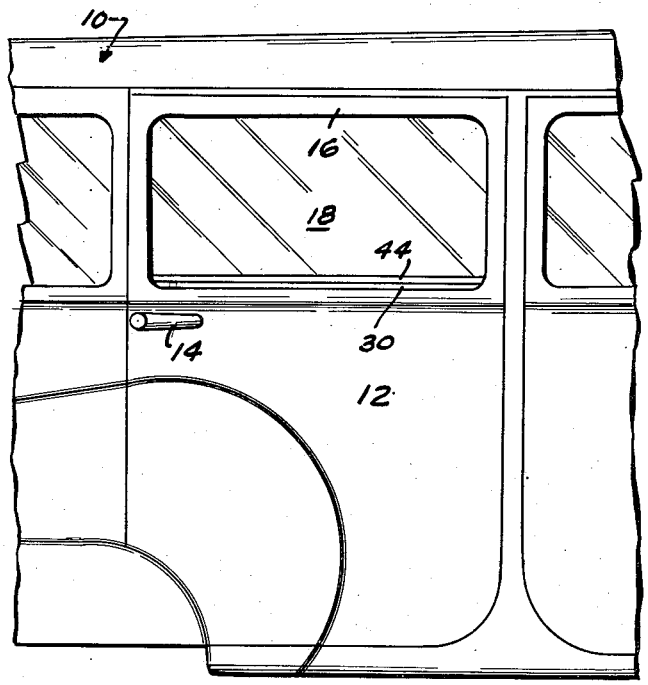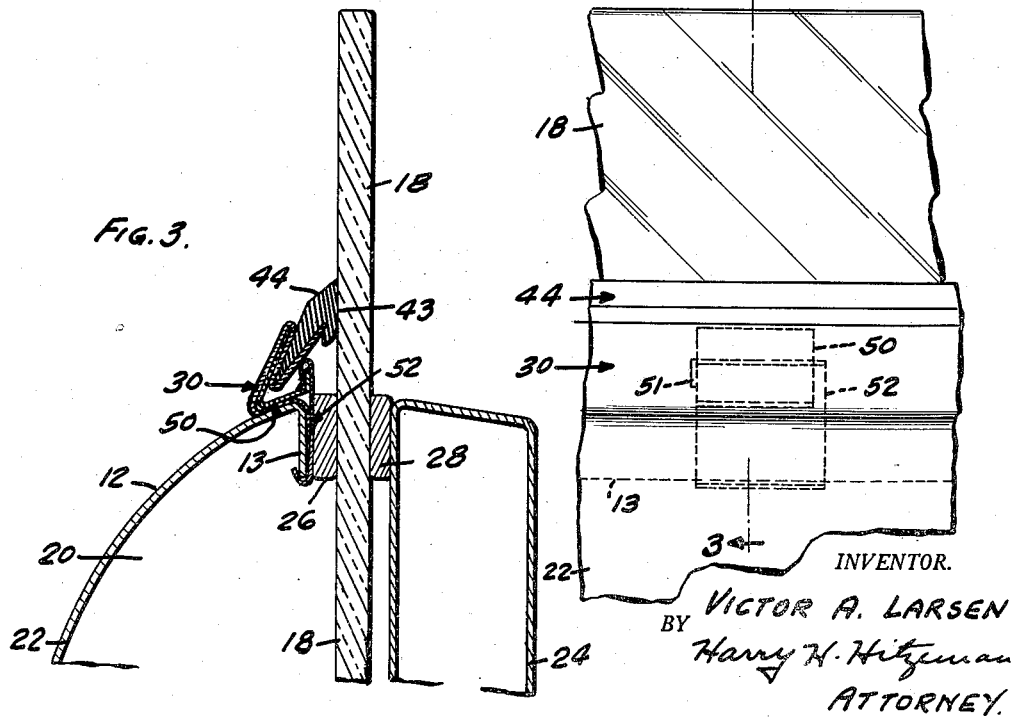

Patented Sept. 25, 1951

2,568,811

UNITED STATES PATENT OFFICE 2,568,811

VEHICLE WINDOW WEATHER STRIP

Victor A. Larsen, Chicago, Ill.

Application April 4, 1950, Serial No. 153,840

5 Claims. (Cl. 20—69)

My invention relates to improvements in vehicle window weather strips.

My invention relates more particularly to weather strip means for use in connection with movable window panes of vehicle windows such as the windows in the doors of automobiles which are capable of being moved open and shut, the window strip being adapted to be secured to the door frame adjacent the lower end of the window opening to prevent moisture, dust and air currents from entering the well in the door which receives the window member in its lowered position.

Weather strips of the type which I propose are adapted to be fastened upon the door frame of automobiles and other vehicles adjacent the window frame for the purpose of preventing moisture from entering the door along the window panes. As is well known to those familiar with automobile construction, several types of automobiles now on the market have doors so constructed that any moisture which enters the door frame at the window glass is trapped within the door, thereby causing rust and deterioration inside of the door.

Weather strips of the type herein referred to are shown and described in my co-pending application Serial No. 133,586 for patent heretofore filed December 17, 1949, now Patent No. 2,563,252, issued August 7, 1951, wherein one type of strip and fastening means are described.

In the above mentioned application, however, attention has been directed to the permanent placement of the weather strips, as where they are installed as standard equipment at the automobile factory. As an alternative form in said application, a method of frictionally holding the strip is shown and described wherein alternate sections of the body are bent in opposite directions to hold the weather strip in place.

The present invention relates more particularly to an improved construction of vehicle window weather strip and a novel method of attaching or affixing the same on the window frames of automobile doors.

The principal object of the present invention is to provide an improved construction of window weather strip for automotive vehicle windows.

A further object of the invention is to provide an improved method of assembling the strip and attaching it to the window frame.

A further object of the invention is to provide an improved channel member for holding the squeegee blade of the weather strip and novel clip members capable of association with the same to fixedly attach the assembly to the window sill.

A further object of the invention is to provide an improved vehicle window weather strip and method of attaching the same, the strip and its associated parts being so constructed that it may be attached to the window sills of automotive vehicles at present on the market as an accessory.

Other objects and advantages will be more apparent from the following description wherein reference is had to the accompanying drawings, upon which Fig. 1 is a fragmentary side elevational view of an automotive vehicle showing one of the doors, the window therein, and my improved vehicle window weather strip mounted thereon;

Fig. 2 is a full size fragmentary side elevational view of a portion of the window sill and weather strip;

Fig. 3 is a vertical sectional view therethrough taken on the lines 3—3 of Fig. 1;

Fig. 4 is a front perspective view of the specially molded squeegee blade which I employ;

Fig. 5 is a similar perspective view of the squeegee blade attaching channel;

Fig. 6 is a front perspective view of one of the channel clips which is employed to hold the assembly on the window frame;

Fig. 7 is a similar front perspective view of one of the holding clips which cooperates with the channel clips to hold the assembly in place;

Fig. 8 is a front perspective view of an assembly of the holding and channel clips showing the manner in which they are connected together in operation; and Fig. 9 is a fragmentary back elevational view of the weather strip assembly showing the manner in which the corners may be rounded to fit into position in the corners of the window sills of automobile doors.

In the embodiment of the invention which I have chosen to illustrate and describe the same, I have shown in Fig. 1 an automotive vehicle 10 which may include a door member 12 having the usual handle 14 and a window frame 16 within which a window pane 18 may be mounted. The window pane 18 may be mounted in the usual way so that it may be raised or lowered by rotating a handle, pushing a button, or by other mechanism capable of actuation on the inside of the car to raise or lower the window when desired.

As clearly shown in Fig. 3, the lower edge of the window pane 18 descends into a well 20 within the metal door frame 12, the door normally including an outside door panel 22, an inner door panel 24 and window guide members 26 and 28. The window guides are preferably of a compressible or similar material to assist in eliminating rattle of the windows in the frames.

Referring now to Figs. 4 to 8 inclusive, the improved window strip which I have provided may include the sheet metal channel member 30 formed by a series of bending operations to the shape shown in Fig. 5, including the vertical section 32 which is adapted to overlie the edge of the outer door panel 22 with the shoulder 34 conforming thereto. The balance of the channel member may be extended upwardly as shown at 36 with a section 38 flattened against the same and a lip 40 extending upwardly therefrom.

The sheet metal is preferably .010 inch thick and is also preferably made of stainless steel which can be chromium plated so that the window strip will add an attractive trim to the windows as well as performing the useful function for which it is provided.

The lip 40 of the channel strip is adapted to engage in the slot 42 in the back of the rubber squeegee blade 44, the leg 46 of the blade being frictionally held in the space between the legs 38 and 40 of the channel strip. A plurality of spaced openings 48 are provided adjacent the lower edge of the channel throughout its length for a purpose which will presently be explained.

Means for holding the channel strip in position on the top edge of the outer door panel may include the two clip members 50 and 52 which are provided. The clip member 50 is adapted to be placed on the channel strip with its flange 54 between the two legs 36 and 38 of the channel strip and with its vertical ledge 56 positioned above the portion 34 of the strip. In this position the channel clips 50 can be slid back and forth to desired locations on the channel strip for holding the same in position.

To attach the channel strip to the door frame, I now connect a holding clip 52 to one of the channel clips 50, as shown in Fig. 8. By moving the same together until the finger ledge 51 strikes the edge of the channel clip, the maximum interlocking is obtained. In this position the assembly is now moved to the side of the door frame and the holding clip 52 is pushed down in the space adjacent the vertical wall 13 of the door sill and the guide 26 until the hook portion 58 thereof extends below the vertical wall 13 and is clipped to the same.

Thus, as shown in Figs. 2 and 3, the weather strip has been securely locked in position on the upper edge of the window sill with the squeegee blade in frictional engagement with the side of the window pane. In this position the window may now be raised and lowered, and the flattened edge 43 of the squeegee blade will wipe against the window, removing dust, moisture, or other sediment which may collect on the window pane surface.

The purpose of the openings 48 spaced throughout the length of the weather strip are to permit the introduction and escape of air, which will happen when driving, so that if any moisture should be collected in the weather strip due to rain or other circumstances, as the car is driven the moisture will be permitted to evaporate and the inside of the weather strip will become dry.

As shown in Fig. 9, the edge 29 of the channel strip may be rounded to conform to the curvature of the window sill of the car door so that when the window strip is mounted in position on the window sill, it assists in providing a decorative trim to the car door rather than detracting in any way from the appearance of the same.

From the above and foregoing description it can be seen that I have provided a highly effective vehicle window weather strip and a simple and easy method of mounting or attaching the same whereby the average purchaser can attach the weather strip to the car windows himself. The unit can be mounted as an accessory upon existing automobiles with the interlocking clip members which I have provided, it being evident that by the use of the same no screws, nails or other attaching means are required, and no tools are required to mount the same in position.

The advantages of a weather strip of the type herein described are believed to be self-evident. By the use of the same moisture is kept out of vehicle doors, thus protecting the door channel stripping, door and window mechanism, and the bottom of the door from deterioration. The pressure of the rubber squeegee against the window pane assists in preventing cracking or breaking of the windows, and definitely eliminates rattling of the same in their frames.

Whenever the operator of a vehicle desires to clean his windows, it is a simple matter to raise and lower the same a few times and the outside of the window pane is effectively clean.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. The combination with a vertically slidable window pane and a sill member for the same, said sill member having a depending flange adjacent said window frame, of a weatherstrip member adapted for connection to said sill member and having a wiper blade of compressible material resiliently held against the surface of said window pane, said weatherstrip member comprising a channel member formed from a flat elongated strip of metal, said member bent throughout its length to include a shoulder portion overlying the sill member, said shoulder portion having a downwardly depending edge fitting over the flange of said sill member, an arm portion extending diagonally upwardly from said shoulder portion and having a section folded back against itself and an upwardly turned lip portion, said wiper blade having a leg portion frictionally held in the space between said arm portion and said upwardly turned lip portion, and clip members for locking said channel member on said sill member, one of said clip members fastened on said channel member and having a vertical ledge and the other having a flat wall with hook portions at the top and bottom of the same, one hook portion adapted to engage under the lower edge of the flange of said sill member and the other over the upper edge of the ledge of said first mentioned clip member.

2. The combination as set forth in claim 1 in which said first named clip member has a diagonally directed flange positioned between the arm portion of said channel member and the folded back section of the same.

3. The combination with a vertically slidable window pane and a sill member for the same, said sill member having a depending flange adjacent said window pane, of a sheet metal weatherstrip capable of connecting thereto and having a compressible wiper blade held against the surface of said window pane, said weatherstrip including a channel member having a folded back wall portion and an upturned lip, said wiper blade mounted on said lip and a plurality of interconnecting channel clip members and holding clip members for connecting said channel member to the flange of said sill member, each of said channel clip members having an upturned ledge and an arm held between the sides of the folded back wall portion of said channel member, and each of said holding clip members having a flat wall portion and inwardly turned end hook portions, one of said hook portions engaging the upturned ledge of a channel clip member and the other engaging below the depending flange of said sill member.

4. The combination with a vertically slidable window pane and a sill member adapted to receive the window pane when lowered, said sill member having a downwardly turned flange adjacent the window pane, of a channel member mounted on said sill, said channel member having a horizontal ledge, an upwardly turned arm portion, a folded back wall portion and a downwardly depending leg overlying the flange of said sill member, said channel member also having a lip portion, a rubber squeegee having a slot fitted over said lip portion and clip means connected under the edge of said sill member for locking said channel member thereon, said clip means including a channel clip having a leg frictionally held between the folded back wall portion of said channel member, said channel clip having a portion slidable on the horizontal ledge of said channel member and a flat vertically positioned holding clip having inwardly turned hook portions, one hook portion engaging a portion of said channel clip and the other engaging under the edge of said sill flange.

5. The combination as set forth in claim 4 in which said channel clip has a stop ledge engaged by the edge of said holding clip in maximum engaging position.

VICTOR A. LARSEN.

REFERENCES CITED

The following references are of record in the file of this patent:

UNITED STATES PATENTS

| Number | Name | Date |
| --- | --- | --- |
| 1,473,310 | Nicholson | Nov. 6, 1923 |
| 1,832,225 | Levan | Nov. 17, 1931 |
| 1,883,815 | Nolan | Oct. 18, 1932 |